US010746145B1

(12) United States Patent
Rondeau

(10) Patent No.: US 10,746,145 B1
(45) Date of Patent: Aug. 18, 2020

(54) ISOLATOR FOR FUEL INJECTOR

(71) Applicant: DELPHI TECHNOLOGIES IP LIMITED, St. Michael (BB)

(72) Inventor: Samuel Rondeau, Henrietta, NY (US)

(73) Assignee: DELPHI TECHNOLOGIES IP LIMITED (BB)

( * ) Notice: Subject to any disclaimer, the term of this patent is extended or adjusted under 35 U.S.C. 154(b) by 0 days.

(21) Appl. No.: 16/406,132

(22) Filed: May 8, 2019

(51) Int. Cl.
| | |
|---|---|
| *F02M 53/04* | (2006.01) |
| *F02M 61/14* | (2006.01) |
| *F02M 61/10* | (2006.01) |
| *B05B 1/30* | (2006.01) |
| *B05B 15/14* | (2018.01) |
| *F02B 77/11* | (2006.01) |
| *F02B 77/13* | (2006.01) |

(52) U.S. Cl.
CPC ......... *F02M 53/046* (2013.01); *B05B 1/3053* (2013.01); *B05B 15/14* (2018.02); *F02M 61/10* (2013.01); *F02M 61/14* (2013.01); *F02B 77/11* (2013.01); *F02B 77/13* (2013.01); *F02M 2200/03* (2013.01); *F02M 2200/858* (2013.01)

(58) Field of Classification Search
CPC .............. B05B 15/14; F02M 2200/03; F02M 2200/26; F02M 53/046
See application file for complete search history.

(56) References Cited

U.S. PATENT DOCUMENTS

| | | | | |
|---|---|---|---|---|
| 4,669,737 A | * | 6/1987 | Diffenderfer | F16J 15/3268 277/551 |
| 5,094,579 A | * | 3/1992 | Johnson | F02B 77/00 411/107 |
| 5,129,658 A | * | 7/1992 | Berton | F02M 61/14 123/470 |
| 5,397,206 A | * | 3/1995 | Sihon | F02B 77/005 411/369 |
| 5,513,603 A | * | 5/1996 | Ang | F02B 77/00 123/90.37 |
| 5,876,023 A | * | 3/1999 | Hain | B64C 1/18 244/119 |
| 5,876,024 A | * | 3/1999 | Hain | B64C 1/18 244/119 |
| 6,334,433 B1 | | 1/2002 | Sumida et al. | |
| 6,591,801 B1 | * | 7/2003 | Fonville | F02F 7/006 123/195 C |

(Continued)

*Primary Examiner* — Kevin R Steckbauer
(74) *Attorney, Agent, or Firm* — Joshua M. Haines

(57) ABSTRACT

A fuel injector isolator includes a support member which is rigid and which is annular in shape being centered about an axis such that the support member has a support member inner periphery which circumferentially surrounds the axis and includes a concave region. The fuel injector isolator also includes an isolation member which is resilient and compliant and which is annular in shape being centered about the axis such that the support member has an isolation member outer periphery and an isolation member inner periphery which accommodates the fuel injector therein. The isolation member is located within the support member inner periphery and includes 1) an isolation member outer periphery upper retention surface which engages the support member first end surface and 2) an isolation member outer periphery lower retention surface which extends into the concave region and engages the concave region of the support member.

20 Claims, 7 Drawing Sheets

(56) References Cited

U.S. PATENT DOCUMENTS

| | | | | |
|---|---|---|---|---|
| 6,805,103 B1* | 10/2004 | Sumida | ............... | F02M 61/14 123/470 |
| 6,811,102 B2* | 11/2004 | Krause | ............... | F02M 61/14 239/533.2 |
| 7,293,550 B2* | 11/2007 | Beardmore | ............ | F02M 61/14 123/470 |
| 7,373,925 B2 | 5/2008 | Reiter et al. | | |
| 7,823,565 B2* | 11/2010 | Chern | ............... | F02M 55/004 123/192.1 |
| 7,827,964 B2* | 11/2010 | Chern | ............... | F02M 61/14 123/470 |
| 8,069,842 B2* | 12/2011 | Kannan | ............... | F02M 61/14 123/470 |
| 8,100,408 B2* | 1/2012 | Kurth | ............... | F02M 61/14 277/549 |
| 8,516,996 B2 | 8/2013 | Solferino et al. | | |
| 8,528,524 B2* | 9/2013 | Hofmann | ............ | F02M 61/14 123/470 |
| 8,763,588 B2* | 7/2014 | Sugiyama | ............ | F02M 61/14 123/470 |
| 8,875,681 B2* | 11/2014 | Kannan | ............... | F16F 1/3735 123/456 |
| 9,347,411 B2* | 5/2016 | Friedrich | ............ | F02M 61/14 |
| 9,404,458 B2* | 8/2016 | Kamada | ............... | F02M 61/14 |
| 9,410,520 B2* | 8/2016 | Franks | ............... | F02M 61/14 |
| 9,574,536 B2* | 2/2017 | Oohata | ............... | F02M 61/14 |
| 9,835,125 B2* | 12/2017 | Rehwald | ............ | F02M 55/025 |
| 9,915,236 B1* | 3/2018 | Bircann | ............... | F02M 61/14 |
| 10,197,033 B2* | 2/2019 | Bayer | ............... | F02M 61/14 |
| 2002/0162538 A1* | 11/2002 | Krause | ............... | F02M 61/14 123/470 |
| 2007/0113828 A1 | 5/2007 | Fonville et al. | | |
| 2007/0175451 A1* | 8/2007 | Beardmore | ............ | F02M 61/14 123/470 |
| 2008/0265520 A1* | 10/2008 | Kurth | ............... | F02M 61/14 277/549 |
| 2010/0175667 A1* | 7/2010 | Chern | ............... | F02M 55/004 123/470 |
| 2010/0175668 A1* | 7/2010 | Chern | ............... | F02M 61/14 123/470 |
| 2011/0000464 A1* | 1/2011 | Kannan | ............... | F02M 55/004 123/470 |
| 2011/0067653 A1* | 3/2011 | Clark | ............... | F02F 1/242 123/41.31 |
| 2011/0132329 A1* | 6/2011 | Hofmann | ............ | F02M 61/14 123/470 |
| 2011/0265767 A1* | 11/2011 | Xu | ............... | F02M 53/046 123/470 |
| 2013/0014719 A1* | 1/2013 | Sugiyama | ............ | F02M 61/14 123/188.1 |
| 2013/0104852 A1* | 5/2013 | Kannan | ............... | F16F 1/3735 123/456 |
| 2014/0048044 A1* | 2/2014 | Kamada | ............... | F02M 61/14 123/470 |
| 2015/0013644 A1* | 1/2015 | Friedrich | ............ | F02M 61/14 123/470 |
| 2015/0040857 A1* | 2/2015 | Franks | ............... | F02M 61/14 123/294 |
| 2017/0350358 A1* | 12/2017 | Bayer | ............... | F02M 61/14 |

* cited by examiner

ISOLATOR FOR FUEL INJECTOR

TECHNICAL FIELD OF INVENTION

The present invention relates to a fuel injector isolator which is used to isolate a fuel injector from a fuel consuming device, for example, an internal combustion engine.

BACKGROUND OF INVENTION

Fuel injection systems that deliver fuel to fuel consuming devices, for example internal combustion engines, have been known for many years. The typical fuel injection system draws fuel from a fuel tank to a fuel rail mounted adjacent to the cylinder bank of the engine. The fuel injectors are electro-mechanical devices that deliver fuel in precise amounts and times to the respective cylinder.

While the engine is running, the valve within each fuel injector is constantly being operationally cycled from an open position to a closed position. Vibration is generated by the mechanical movement of the injector valve and pressure waves are generated by the movement of the fuel flowing through the injectors. Additionally, a substantial amount of heat generated in the combustion chambers of the cylinder heads may be transferred from the engine to the fuel injector. In order to minimize transfer of heat from the engine to the fuel injector and to prevent the transmission of vibration from the fuel injector, it is known to provide a fuel injector isolator. In one known arrangement as shown in FIG. 6, a fuel injector isolator 118 is provided for receiving a fuel injector 110 (only a portion of which is shown). Fuel injector isolator 118 is a two-piece assembly of a support member 146 and an isolation member 148. Support member 146 is made of a rigid material, for example metal, while isolation member 148 is made of a resilient and compliant material, for example an elastomer. Isolation member 148 provides resistance to transfer of heat and vibration while support member 146 provides support to isolation member 146. In order to form isolation member 148 and to retain isolation member 148 to support member 146, it is known to coat support member 146 with an adhesive and then place support member 146 into a portion of a mold cavity. Next, liquid elastomer is injected into the mold cavity where it bonds with support member 146. When the liquid elastomer is allowed to cool and solidify, the completed fuel injector isolator 118 is removed from the mold cavity. While isolation member 148 may be effective for isolating fuel injector 110, insert molding isolation member 148 to support member 146 can be difficult because the position of support member 146 must be controlled during the molding operation and flash across the insert may result from difficulty in sealing of the mold to support member 146. These issues, together with the adhesive needed to bond isolation member 148 to support member 146, increase the cost to manufacture fuel injector isolator 118 and may affect quality.

What is needed a fuel injector isolator which minimizes or eliminates one or more of the shortcomings set forth above.

SUMMARY OF THE INVENTION

A fuel injector isolator for mounting a fuel injector in a bore of a fuel consuming device includes a support member which is rigid and which is annular in shape being centered about an axis such that the support member has a support member inner periphery which circumferentially surrounds the axis, the support member extending along the axis from a support member first end surface to a support member second end surface, wherein a profile of the support member inner periphery includes a concave region; and an isolation member which is resilient and compliant and which is annular in shape being centered about the axis such that the support member has an isolation member outer periphery and an isolation member inner periphery which accommodates the fuel injector therein, the isolation member being located within the support member inner periphery, the isolation member outer periphery having 1) an isolation member outer periphery upper retention surface which engages the support member first end surface, thereby fixing the isolation member relative to the support member in a first direction along the axis and 2) an isolation member outer periphery lower retention surface which extends into the concave region and engages the concave region of the support member, thereby fixing the isolation member relative to the support member in a second direction along the axis which is opposite to the first direction. A fuel injector is also provided which includes the foregoing fuel injector isolator. The fuel injector as described herein allows for the isolation member to be formed in an injection molding operation or a compression molding operation independent of the support member and assembled thereto without the need for adhesives. Forming the isolation member in an injection molding operation or a compression molding operation independent of the support member eliminates the complexity of overmolding the isolation member 48 to the support member, thereby increasing quality and minimizing cost.

BRIEF DESCRIPTION OF DRAWINGS

This invention will be further described with reference to the accompanying drawings in which.

DETAILED DESCRIPTION OF INVENTION

Figure 1:
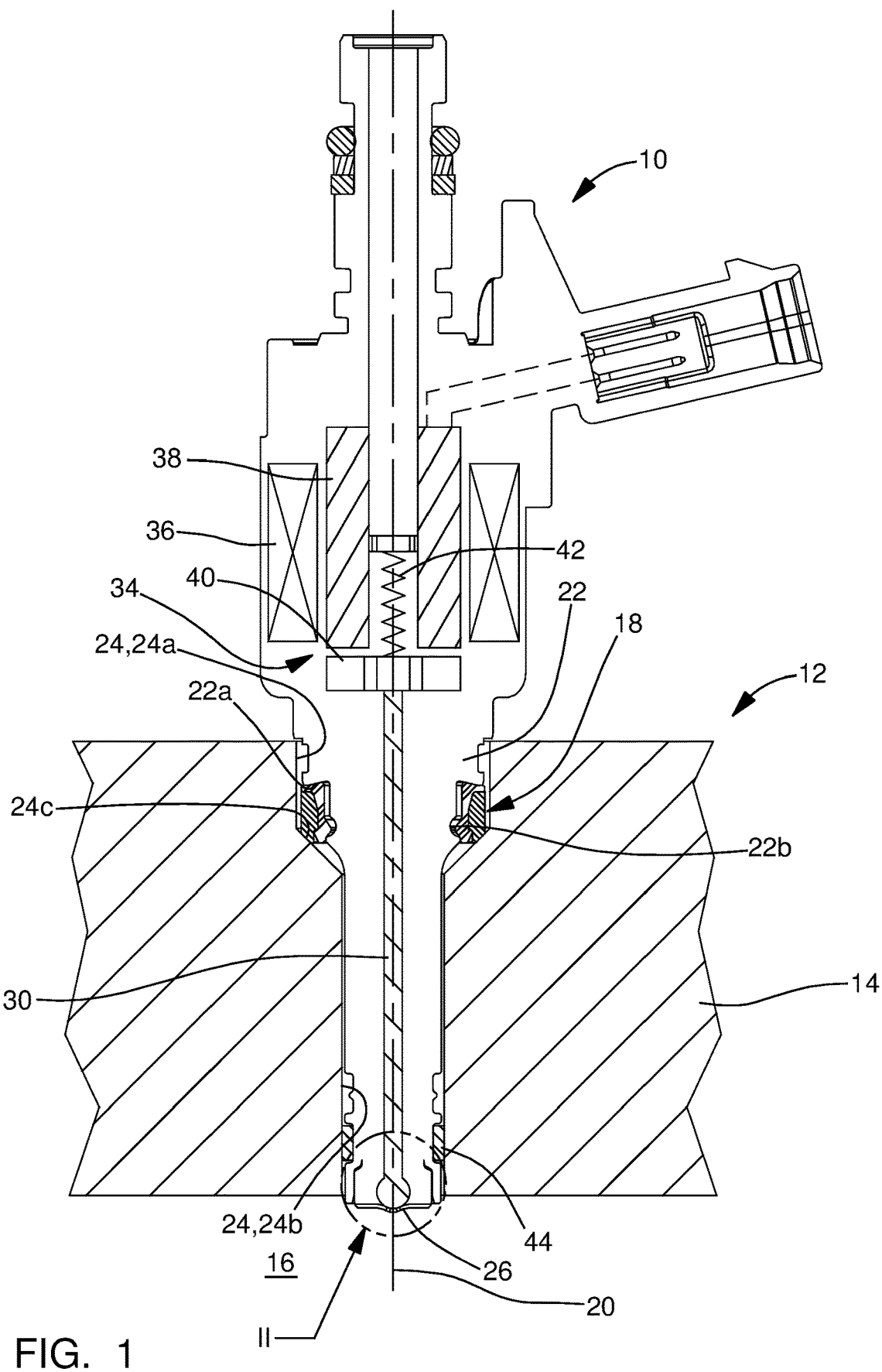
FIG. 1 is a view of a fuel injector, including an isolation member in accordance with the present disclosure, installed on an internal combustion engine.
Figure 2:
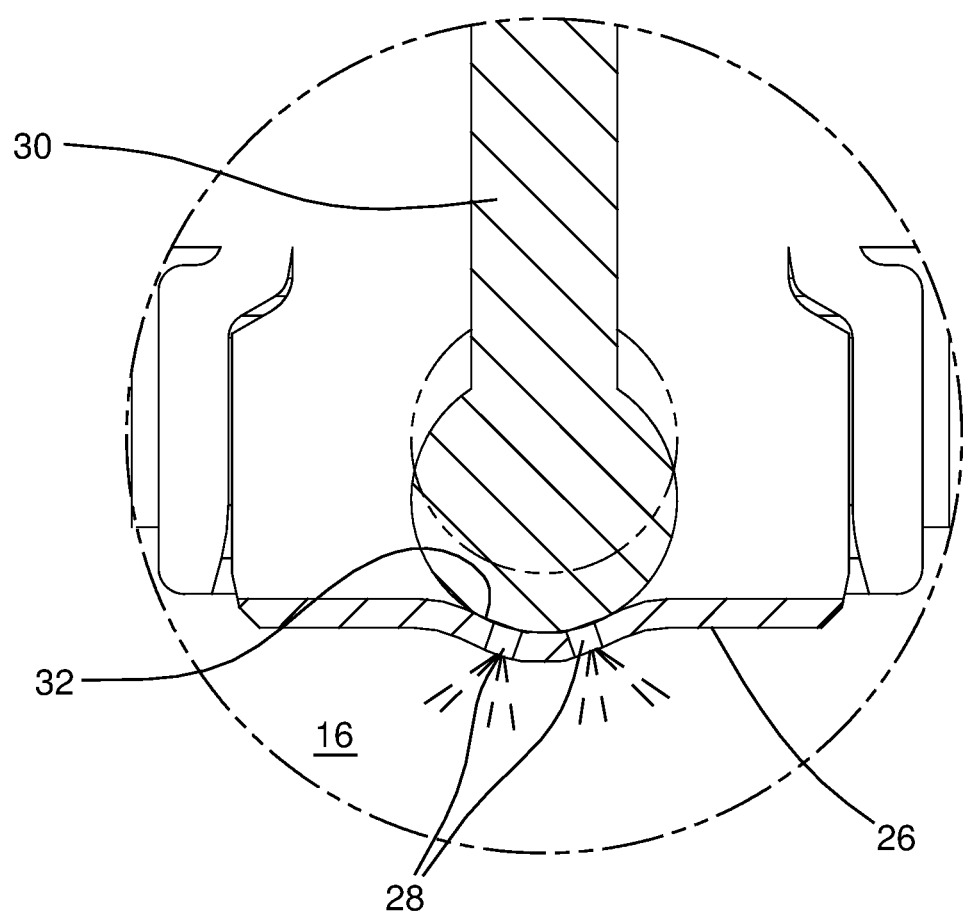
FIG. 2 is an enlargement of circle II of FIG. 1.

Referring initially to FIGS. 1 and 2, a fuel injector 10, the inner workings of which are illustrated schematic in nature, is illustrated for supplying fuel to a fuel consuming device which may be, by way of non-limiting example only, an internal combustion engine 12 of which a cylinder head 14 and a combustion chamber 16 are shown. A fuel injector isolator 18 is provided between fuel injector 10 and cylinder head 14 in order to minimize transfer of heat from cylinder head 14 to fuel injector 10 and also to minimize transfer of vibrations from fuel injector 10, thereby minimizing noise that may be propagated during operation of fuel injector 10 and internal combustion engine 12 when fuel is injected from fuel injector 10 to combustion chamber 16 for combustion of the fuel within combustion chamber 16 after compression by a piston (not shown), the combustion process being widely known by those of ordinary skill in the art of internal combustion engines.

Fuel injector 10 extends along an axis 20 and includes a fuel injector body 22 which is configured to be inserted into a fuel injector receiving bore 24 of cylinder head 14 along axis 20 such that a nozzle tip 26 of fuel injector body 22 communicates with combustion chamber 16 and includes one or more nozzle openings 28 therein from which fuel is selectively discharged from fuel injector 10 into combustion chamber 16. The discharge of fuel from nozzle openings 28 is controlled by a valve needle 30 located within fuel injector body 22 where valve needle 30 is selectively seated with a valve seat 32 (valve needle 30 being shown in solid lines in FIG. 2) to stop discharge of fuel through nozzle openings 28 and is selectively unseated with valve seat 32 (valve needle 30 being shown in phantom lines in FIG. 2) to discharge fuel from fuel injector 10 into combustion chamber 16. Movement of valve needle 30 is controlled by an actuator 34, illustrated herein as a solenoid actuator. As embodied herein, actuator 34 includes a wire winding 36, a pole piece 38 which is stationary, an armature 40 which is moveable with valve needle 30, and a return spring 42 which urges valve needle 30 in a direction to be seated with valve seat 32. When wire winding 36 is energized with an electric current, armature 40 is magnetically attracted to pole piece 38, thereby unseating valve needle 30 from valve seat 32. Conversely, when the electric current to wire winding 36 is stopped, the magnetic attraction between armature 40 and pole piece 38 is stopped, thereby allowing return spring 42 to move valve needle 30 to be seated with valve seat 32. While actuator 34 has been illustrated herein as a solenoid actuator, it should be understood that actuator 34 may take other forms, which may be, by way of non-limiting example only, a piezoelectric actuator. Furthermore, while actuator 34 has been illustrated as directly actuating valve needle 30, it should be understood that actuator 34 may be indirect acting such that the actuator may be used to control fuel pressure in a control chamber such that the fuel pressure in the control chamber affects the position of valve needle 30.

Fuel injector receiving bore 24 is a stepped bore which includes at least two sections of distinct diameter such that a fuel injector receiving bore outer portion 24a is distal from combustion chamber 16 and such that a fuel injector receiving bore inner portion 24b is proximal to combustion chamber 16. Fuel injector receiving bore outer portion 24a and fuel injector receiving bore inner portion 24b are each centered about axis 20, however, fuel injector receiving bore outer portion 24a is larger in diameter than fuel injector receiving bore inner portion 24b. Fuel injector 10 includes a combustion seal 44 which is disposed radially between fuel injector body 22 and fuel injector receiving bore inner portion 24b, thereby preventing combustion gases from passing between the interface of fuel injector body 22 and fuel injector receiving bore inner portion 24b. A fuel injector receiving bore shoulder 24c is formed between fuel injector receiving bore outer portion 24a and fuel injector receiving bore inner portion 24b such that fuel injector receiving bore shoulder 24c is perpendicular, inclined, or a combination of perpendicular and inclined to axis 20. Fuel injector isolator 18 rests upon fuel injector receiving bore shoulder 24c, thereby axially positioning fuel injector 10 within fuel injector receiving bore 24.

Figure 3:
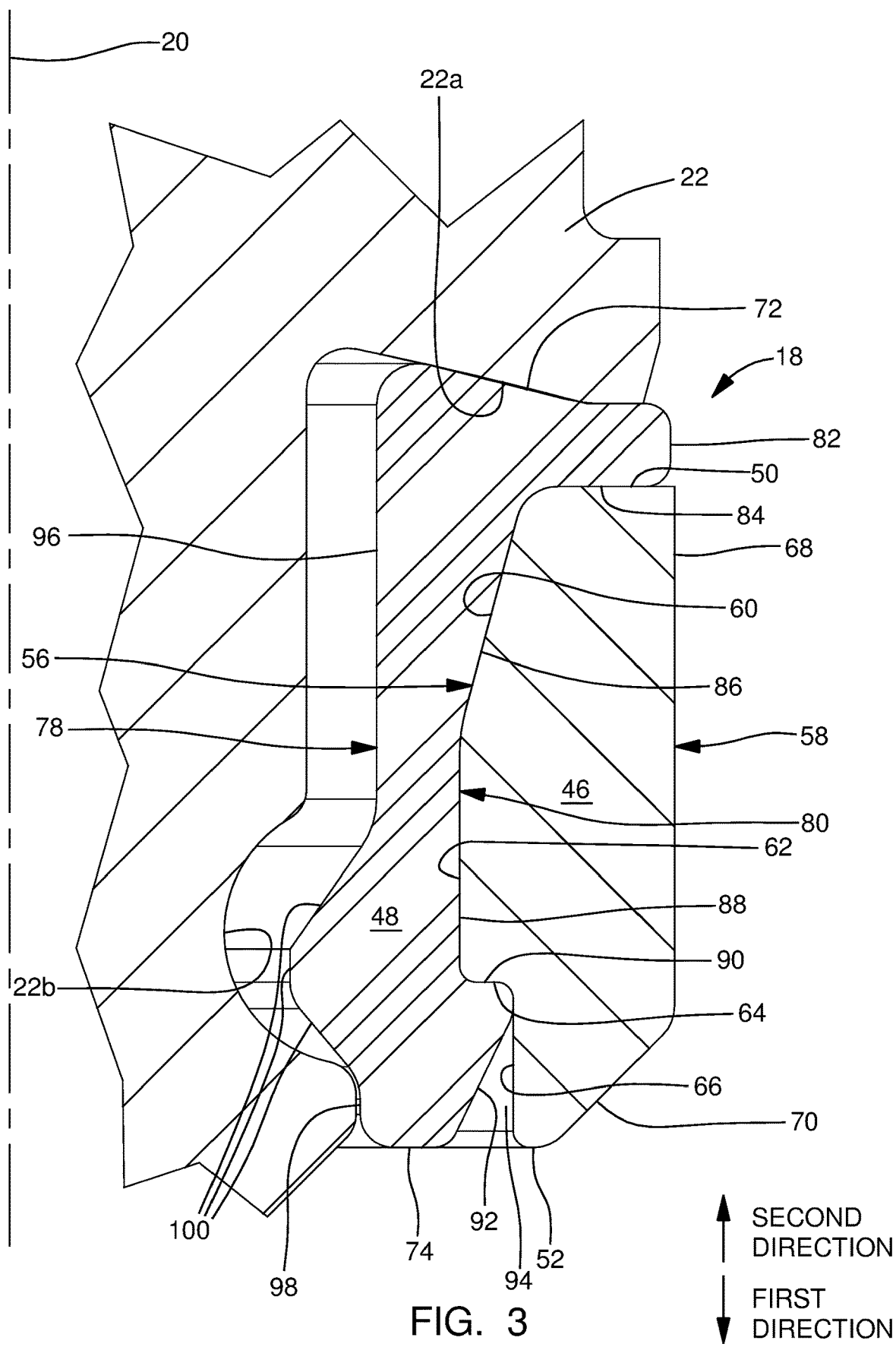
FIG. 3 is an axial cross-sectional view of the fuel injector isolator, shown at only one radial location.

Reference will now be made to FIG. 3 which is an axial cross-sectional view of fuel injector isolator 18 at only one radial location of fuel injector isolator 18 which is the right-hand portion of fuel injector isolator 18 as viewed in FIG. 1. Fuel injector isolator 18 is an assembly of two elements, namely a support member 46 which is rigid and which is annular in shape being centered about axis 20 and an isolation member 48 which is resilient and compliant and which is annular in shape being centered about axis 20. Support member 46 is preferably made of metal, for example stainless steel, however use of plastic or other materials are also possible as long as support member 46 is more rigid than isolation member 48, thereby providing support to isolation member 48, and is able to accommodate the temperatures to which it be subjected by internal combustion engine 12. When support member 46 is made of metal, the features of support member 46 may be made through conventional milling, turning, or stamping techniques or one or more of the foregoing or may alternatively be made through casting, metal injection molding, or powder metal process which net forms the desired shapes and features of support member 46 which will be described later or which may be followed by one or more of the conventional milling, turning, or stamping techniques. Alternatively, when support member 46 is made of plastic, support member 46 is preferably made in in an injection molding operation without the need for further processing to provide the desired shapes and features of support member 46. Isolation member 48 is preferably an elastomer (natural, synthetic, or combination of the two) and may be, by way of non-limiting example only, a fluoroelastomer with a 75 Shore A durometer. Consequently, isolation member 48 is able to be easily net-formed in an injection molding operation or a compression molding operation without the need for further processing to provide the desired shapes and features of isolation member 48 which will be described later. Also consequently, isolation member 48 minimizes heat transfer from cylinder head 14 to fuel injector 10 and also minimizes transmission of vibrations from fuel injector 10 which could otherwise lead to noise propagation which may be undesirable. Support member 46 and isolation member 48 will be described in greater detail in the paragraphs that follow.

Support member 46 extends along axis 20 from a support member first end surface 50 to a support member second end surface 52. Since support member 46 is annular in shape, a support member central passage 54 extends axially entirely therethrough. A support member inner periphery 56 circumferentially surrounds, and faces toward, axis 20 while a support member outer periphery 58 circumferentially surrounds, and faces away from axis 20. Support member inner periphery 56 and support member outer periphery 58 both extend from support member first end surface 50 to support member second end surface 52.

Support member inner periphery 56 will now be described relative to a profile of support member inner periphery 56, i.e. shape of support member inner periphery 56 when sectioned by a plane upon which axis 20 lies as shown in FIG. 3. Support member inner periphery 56 includes a support member inner periphery lead-in surface 60 which decreases in diameter along axis 20 in a first direction which is in a direction from support member first end surface 50 toward support member second end surface 52, i.e. downward as oriented in the figures. By having support member inner periphery lead-in surface 60 decrease in diameter along axis 20 in the first direction, support member inner periphery lead-in surface 60 helps to guide and compress isolation member 48 radially inward when support member 46 and isolation member 48 are assembled to each other as will be described in greater detail later. Preferably, support member inner periphery lead-in surface 60 decreases in diameter at a constant rate along axis 20 in the first direction, and consequently, support member inner periphery lead-in surface 60 is frustoconical in shape as illustrated in the figures. As shown in the figures, a radius or chamfer may join support member first end surface 50 to support member inner periphery lead-in surface 60. Following support member inner periphery lead-in surface 60 in the first direction along axis 20 is a support member inner periphery central surface 62 which is preferably cylindrical as shown, thereby being a constant diameter along axis 20. As shown in the figures, a radius may join support member inner periphery lead-in surface 60 to support member inner periphery central surface 62. Following support member inner periphery central surface 62, is a support member inner periphery retention surface 64 which may be perpendicular to axis 20 such that support member inner periphery retention surface 64 extends radially outward from support member inner periphery central surface 62. As shown in the figures, a radius or chamfer may join support member inner periphery central surface 62 to support member inner periphery retention surface 64. Following support member inner periphery retention surface 64 in the first direction along axis 20 is a support member inner periphery lower surface 66 which is preferably cylindrical as shown, thereby being a constant diameter along axis 20. It is important to note that support member inner periphery lower surface 66 is larger in diameter than support member inner periphery central surface 62, and consequently, support member inner periphery lower surface 66 is a greater radial distance from axis 20 than support member inner periphery central surface 62. As a result, support member inner periphery retention surface 64 and support member inner periphery lower surface 66 together define a concave region of support member inner periphery 56. As shown in the figures, a fillet or chamfer may join support member inner periphery retention surface 64 to support member inner periphery lower surface 66 and a radius or chamfer may join support member inner periphery lower surface 66 to support member second end surface 52.

Support member outer periphery 58 includes a support member outer periphery upper surface 68 which is preferably cylindrical, thereby being a constant diameter along axis 20. As shown in the figures, a radius or chamfer may join support member first end surface 50 to support member outer periphery upper surface 68. Following support member outer periphery upper surface 68 in the first direction along axis 20 is a support member outer periphery lower surface 70 which is preferably inclined relative to axis 20 such that support member outer periphery lower surface 70 decreases in diameter when moving along axis 20 in the first direction such that support member outer periphery lower surface 70 rests upon fuel injector receiving bore shoulder 24c. Preferably, support member outer periphery lower surface 70 decreases in diameter at a constant rate along axis 20 in the first direction, and consequently, support member outer periphery lower surface 70 is frustoconical in shape as illustrated in the figures. Also preferably, support member outer periphery lower surface 70 is configured to be complementary to fuel injector receiving bore shoulder 24c such that fuel injector receiving bore shoulder 24c and support member outer periphery lower surface 70 mate in a face contact rather than a line contact. As shown in the figures, a radius or chamfer may join support member outer periphery upper surface 68 to support member outer periphery lower surface 70 and a radius or chamfer may join support member outer periphery lower surface 70 to support member second end surface 52.

Isolation member 48 extends along axis 20 from an isolation member first end surface 72 to an isolation member second end surface 74 such that isolation member first end surface 72 mates with a fuel injector body shoulder 22a of fuel injector body 22. Since isolation member 48 is annular in shape, an isolation member central passage 76 extends axially entirely therethrough such that isolation member 48 includes and isolation member inner periphery 78 and an isolation member outer periphery 80. Isolation member inner periphery 78 and isolation member outer periphery 80 both extend from isolation member first end surface 72 to isolation member second end surface 74.

Isolation member outer periphery 80 will now be described relative to a profile of isolation member outer periphery 80, i.e. shape of isolation member outer periphery 80 when sectioned by a plane upon which axis 20 lies as shown in FIG. 3. Isolation member outer periphery 80 includes an isolation member outer periphery upper surface 82 which may be cylindrical as shown, thereby being a constant diameter along axis 20. As shown in the figures, a radius or chamfer may join isolation member first end surface 72 to isolation member outer periphery upper surface 82. Following isolation member outer periphery upper surface 82 is an isolation member outer periphery upper retention surface 84 which may be perpendicular to axis 20 such that isolation member outer periphery upper retention surface 84 mates with support member first end surface 50 of support member 46, thereby fixing isolation member 48 relative to support member 46 in the first direction along axis 20, i.e. downward as viewed in the figures. It should be noted that isolation member outer periphery upper retention surface 84 may be inclined relative to axis 20 to match support member first end surface 50 if support member first end surface 50 is inclined relative to axis 20 rather than being perpendicular to axis 20. As shown in the figures, a radius or chamfer may join isolation member outer periphery upper surface 82 and isolation member outer periphery upper retention surface 84. Following isolation member outer periphery upper retention surface 84 along axis 20 in the first direction is an isolation member outer periphery inclined surface 86. Isolation member outer periphery inclined surface 86 is preferably inclined to be complementary to support member inner periphery lead-in surface 60. Consequently, isolation member outer periphery inclined surface 86 is frustoconical in shape and mates with support member inner periphery lead-in surface 60 in a face contact rather than a line contact. As shown in the figures, a fillet or chamfer may join isolation member outer periphery upper retention surface 84 to isolation member outer periphery inclined surface 86. Following isolation member outer periphery inclined surface 86 along axis 20 in the first direction is an isolation member outer periphery central surface 88 which is complementary to support member inner periphery central surface 62 such that isolation member outer periphery central surface 88 is cylindrical and mates with support member inner periphery central surface 62 in a face contact rather than a line contact. As shown in the figures, a fillet or chamfer may join isolation member outer periphery inclined surface 86 to isolation member outer periphery central surface 88. Following isolation member outer periphery central surface 88 is an isolation member outer periphery lower retention surface 90 which may be perpendicular to axis 20 such that isolation member outer periphery lower retention surface 90 extends radially outward from isolation member outer periphery central surface 88. Isolation member outer periphery lower retention surface 90 extends into the concave region of support member inner periphery 56 such that isolation member outer periphery lower retention surface 90 is in axial alignment with, and engages, support member inner periphery retention surface 64, thereby fixing isolation member 48 relative to support member 46 in a second direction along axis 20, the second direction, i.e. upward as viewed in the figures, being opposite of the first direction. As shown in the figures, a fillet or chamfer may join isolation member outer periphery central surface 88 to isolation member outer periphery lower retention surface 90. Extending away from isolation member outer periphery lower retention surface 90 along axis 20 in the first direction is an isolation member outer periphery lead-in surface 92 which decreases in diameter along axis 20 in the first direction. By having isolation member outer periphery lead-in surface 92 decrease in diameter along axis 20 in the first direction, isolation member outer periphery lead-in surface 92 helps to guide and compress isolation member 48 radially inward when support member 46 and isolation member 48 are assembled to each other as will be described in greater detail later. Preferably, isolation member outer periphery lead-in surface 92 decreases in diameter at a constant rate along axis 20 in the first direction, and consequently, isolation member outer periphery lead-in surface 92 is frustoconical in shape as illustrated in the figures. As shown in the figures, a radius or chamfer may join isolation member outer periphery lower retention surface 90 to isolation member outer periphery lead-in surface 92 and a radius or chamfer may join isolation member outer periphery lead-in surface 92 to isolation member second end surface 74. Furthermore, as can be seen in the figures, isolation member outer periphery lead-in surface 92 diverges away from support member inner periphery lower surface 66 in the first direction such that an annular space 94 is formed between isolation member outer periphery lead-in surface 92 and support member inner periphery lower surface 66.

Isolation member inner periphery 78 includes an isolation member inner periphery upper surface 96 which is preferably cylindrical, thereby being a constant diameter along axis 20. As shown in the figures, a radius or chamfer may join isolation member first end surface 72 to isolation member inner periphery upper surface 96. Isolation member inner periphery 78 also includes an isolation member inner periphery lower surface 98 which is preferably cylindrical, thereby being a constant diameter along axis 20. As shown in the figures, a radius or chamfer may join isolation member second end surface 74 to isolation member inner periphery lower surface 98. Isolation member inner periphery 78 also includes an isolation member inner periphery convex surface 100 which extends radially inward from isolation member inner periphery upper surface 96 and isolation member inner periphery lower surface 98 toward axis 20 such that isolation member inner periphery convex surface 100 extends into fuel injector body annular channel 22b of fuel injector body 22. Isolation member inner periphery convex surface 100 extending into fuel injector body annular channel 22b prevents fuel injector isolator 18 from falling off of fuel injector 10 prior to fuel injector 10 being assembled to internal combustion engine 12. As shown in the figures, a fillet or chamfer may join isolation member inner periphery upper surface 96 to isolation member inner periphery convex surface 100 and a fillet or chamfer may join isolation member inner periphery lower surface 98 to isolation member inner periphery convex surface 100.

Figure 4A:
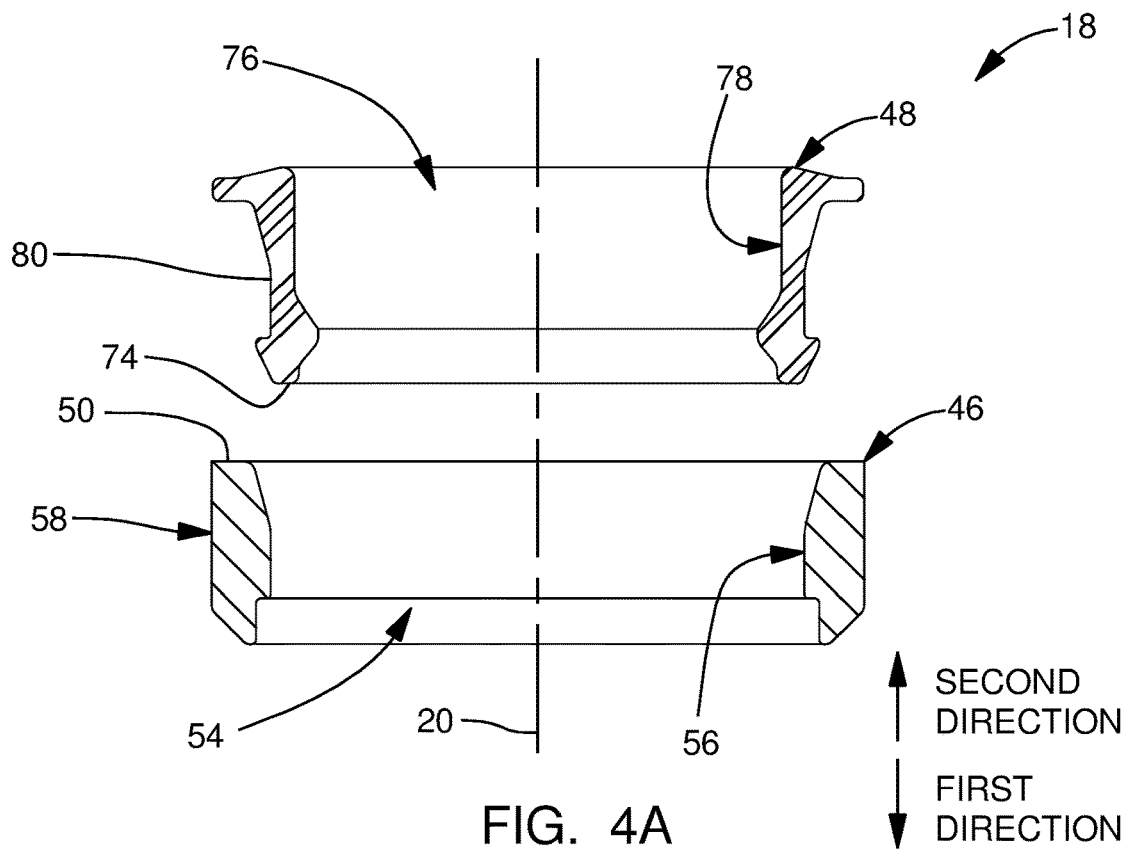
FIGS. 4A-4D are axial cross-sectional views of the fuel injector isolator showing a progression of positions during assembly of a support member and an isolation member of the fuel injector isolator.
Figure 4B:
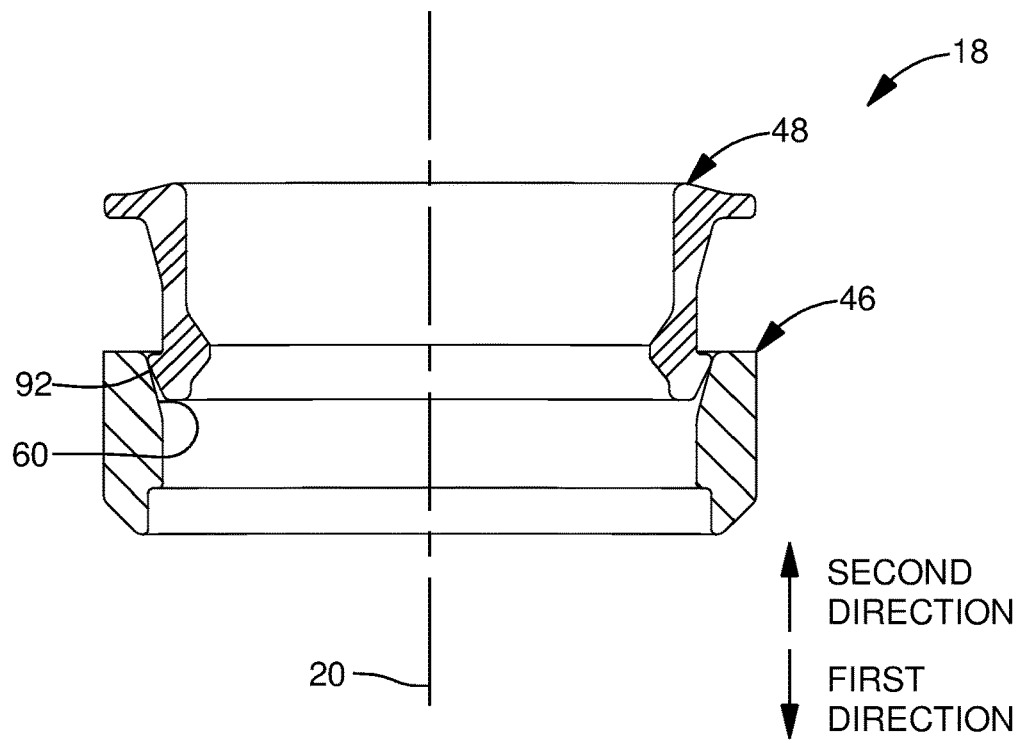
Figure 4C:
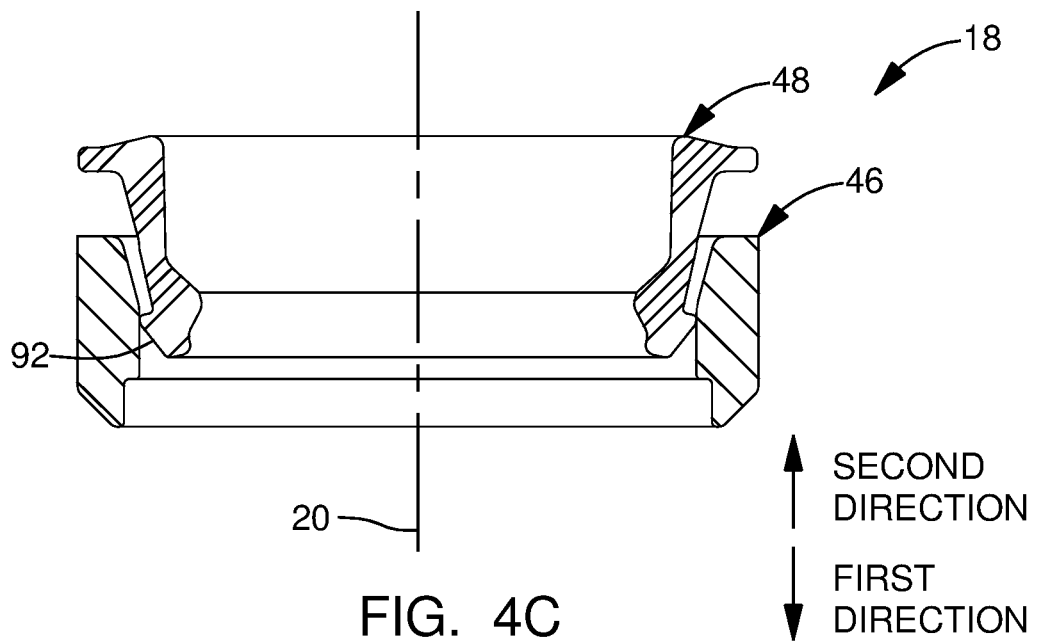
Figure 4D:
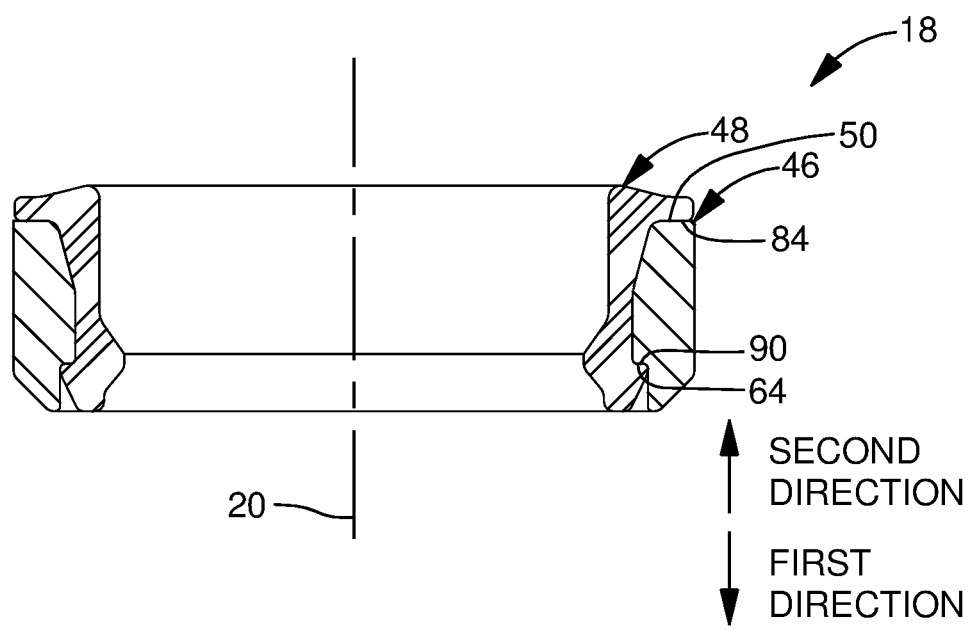

Now referring to FIGS. 4A-4D, which represent a progression of positions of support member 46 and isolation member 48, assembly of support member 46 and isolation member 48 to each other will be described. First, as shown in FIG. 4A, support member 46 and isolation member 48 are arranged to be oriented with support member first end surface 50 facing toward isolation member second end surface 74. Next, support member 46 and isolation member 48 are moved axially relative to each other along axis 20 so as to bring support member 46 and isolation member 48 closer together. For simplicity, the remainder of this description will be provided with isolation member 48 being moved in the first direction, i.e. downward as viewed in the figures, while support member 46 remains stationary. However, it should be understood that in an alternative, support member 46 is moved in the second direction, i.e. upward as viewed in the figures while isolation member 48 remains stationary or support member 46 is moved in the second direction and isolation member 48 is simultaneously moved in the first direction. As isolation member 48 is moved in the first direction relative to support member 46, isolation member outer periphery lead-in surface 92 will engage support member inner periphery lead-in surface 60 as illustrated in FIG. 4B. As isolation member 48 continues to move in the first direction along axis 20 relative to support member 46, the inclined nature of isolation member outer periphery lead-in surface 92 and support member inner periphery lead-in surface 60 will cause the portion of isolation member 48 which contains isolation member outer periphery lead-in surface 92 to be elastically deformed radially inward as shown in FIG. 4C. After isolation member 48 has been moved sufficiently far in the first direction so as to cause isolation member outer periphery lower retention surface 90 to be aligned with the concave region of support member 46, isolation member 48 rebounds radially outward as shown in FIG. 4D due to the resilient and elastic properties of isolation member 48. After isolation member 48 has rebounded toward its original shape, isolation member outer periphery upper retention surface 84 engages support member first end surface 50 of support member 46 and isolation member outer periphery lower retention surface 90 engages support member inner periphery retention surface 64. Consequently, support member 46 is captured between isolation member outer periphery upper retention surface 84 and isolation member outer periphery lower retention surface 90, thereby limiting or preventing relative movement between support member 46 and isolation member 48 along axis 20.

Figure 5:
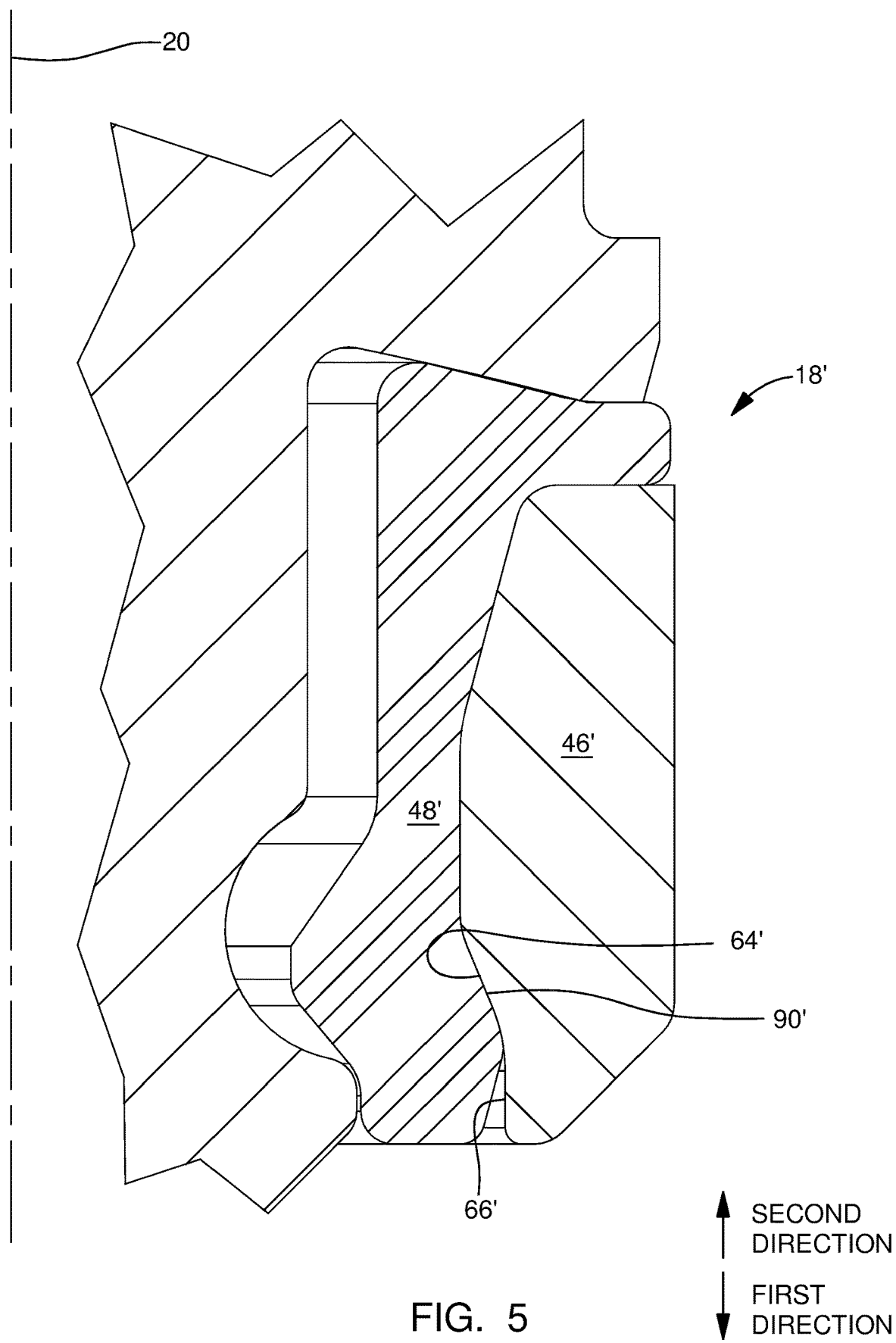
FIG. 5 is an axial cross-sectional view of another fuel injector isolator in accordance with the disclosure, shown at only one radial location.
Figure 6:
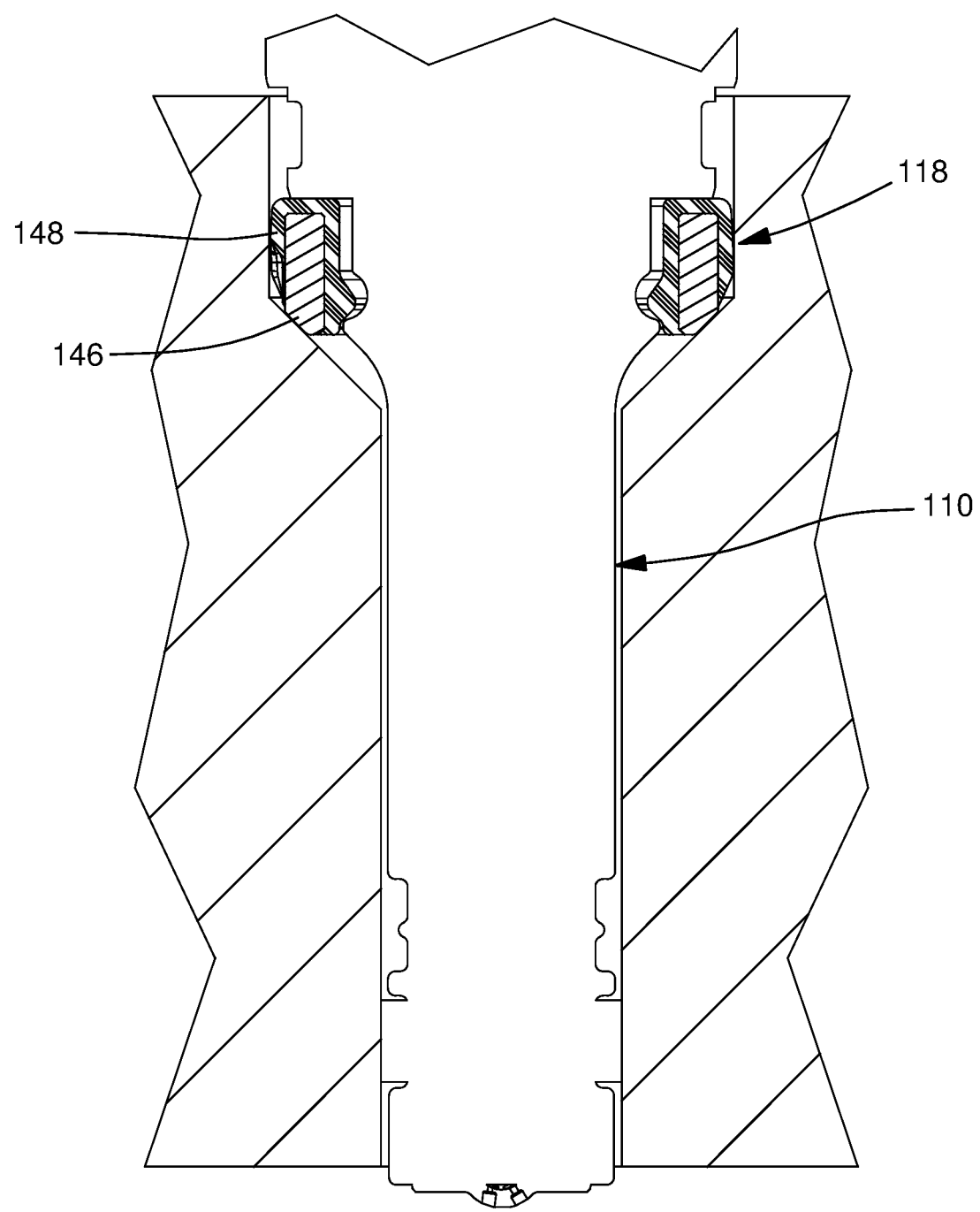
FIG. 6 is a view of a fuel injector installed on an internal combustion engine and using a known fuel injector isolator.

Reference will now be made to FIG. 5 which shows a fuel injector isolator 18' which is an alternative to fuel injector isolator 18. Fuel injector isolator 18' and fuel injector isolator 18 are substantially the same, and consequently, only the significant distinctions will be discussed. Furthermore, the assembly process of fuel injector isolator 18' is substantially the same as the previously described assembly process of fuel injector isolator 18, and consequently will not be further described herein. Fuel injector isolator 18' includes a support member 46' and an isolation member 48', the materials of each being the same as described previously with regard to support member 46 and isolation member 48 respectively. The distinguishing feature of support member 46' from support member 46 is that support member 46' includes support member inner periphery retention surface 64' which replaces support member inner periphery retention surface 64. Support member inner periphery retention surface 64' is inclined relative to axis 20, thereby increasing in diameter along axis 20 in the first direction rather than being perpendicular to axis 20. Preferably, support member inner periphery retention surface 64' is inclined at a constant rate along axis 20 and is therefore frustoconical in shape. Support member inner periphery retention surface 64' together with a support member inner periphery lower surface 66' define a concave region. In order to complement support member inner periphery retention surface 64', isolation member 48' includes an isolation member outer periphery lower retention surface 90' which is inclined relative to axis 20, thereby increasing in diameter along axis 20 in the first direction. Preferably, isolation member outer periphery lower retention surface 90' is inclined at a constant rate along axis 20 and is therefore frustoconical in shape and matches the incline of support member inner periphery retention surface 64'. Isolation member outer periphery lower retention surface 90' extends into the concave region of support member 46' and engages support member inner periphery retention surface 64', thereby fixing isolation member 48' relative to support member 46' in the second direction along axis 20.

Fuel injector isolator 18 and fuel injector isolator 18' as described herein allow for isolation member 48 and isolation member 48' to be formed in an injection molding operation or a compression molding operation independent of support member 46 and support member 46' respectively and assembled thereto without the need for adhesives. Forming isolation member 48 and isolation member 48' in an injection molding operation or a compression molding operation independent of support member 46 and support member 46' eliminates the complexity of overmolding the isolation member 48 and isolation member 48' to support member 46 and support member 46' respectively, thereby increasing quality and minimizing cost. While fuel injector isolator 18 and fuel injector isolator 18' have been described herein as being free of adhesives for retaining support member 46 and isolation member 48 together and for retaining support member 46' and 48' together, it should be understood that adhesives may also be included in order to enhance retention.

While the invention has been described by reference to various specific embodiments, it should be understood that numerous changes may be made within the spirit and scope of the inventive concepts described. Accordingly, it is intended that the invention not be limited to the described embodiments, but rather only to the extent set forth in the claims that follow.

I claim:

1. A fuel injector isolator for mounting a fuel injector in a bore of a fuel consuming device, said fuel injector isolator comprising:
   a support member which is rigid and which is annular in shape being centered about an axis such that said support member has a support member inner periphery which circumferentially surrounds said axis, said support member extending along said axis from a support member first end surface to a support member second end surface, wherein a profile of said support member inner periphery includes a concave region; and
   an isolation member which is resilient and compliant and which is annular in shape being centered about said axis such that said support member has an isolation member outer periphery and an isolation member inner periphery which accommodates said fuel injector therein, said isolation member being located within said support member inner periphery, said isolation member outer periphery having 1) an isolation member outer periphery upper retention surface which engages said support member first end surface, thereby fixing said isolation member relative to said support member in a first direction along said axis and 2) an isolation member outer periphery lower retention surface which extends into said concave region and engages said concave region of said support member, thereby fixing said isolation member relative to said support member in a second direction along said axis which is opposite to said first direction.

2. A fuel injector isolator as in claim 1, wherein said support member inner periphery includes a support member inner periphery central surface which is proximal to said support member first end surface and which is a first radial distance from said axis, 2) a support member inner periphery lower surface which is distal from said support member first end surface and which is a second radial distance from said axis such that said second radial distance is greater than said first radial distance, and 3) a support member inner periphery retention surface which is between said support member inner periphery central surface and said support member inner periphery lower surface, wherein said support member inner periphery retention surface and said support member inner periphery lower surface define said concave region.

3. A fuel injector isolator as in claim 2, wherein:
   said support member inner periphery retention surface is perpendicular to said axis; and
   said isolation member outer periphery lower retention surface is perpendicular to said axis such that said isolation member outer periphery lower retention surface engages said support member inner periphery retention surface, thereby fixing said isolation member relative to said support member in said second direction.

4. A fuel injector isolator as in claim 2, wherein;
   said support member inner periphery retention surface is inclined relative to said axis; and
   said isolation member outer periphery lower retention surface is inclined relative to said axis and complimentary to said support member inner periphery retention surface such that said isolation member outer periphery lower retention surface engages said support member inner periphery retention surface, thereby fixing said isolation member relative to said support member in said second direction.

5. A fuel injector isolator as in claim 1, wherein said support member inner periphery includes a support member inner periphery lead-in surface which is located axially between said support member first end surface and said concave region, said support member inner periphery lead-in surface decreasing in diameter along said axis in said first direction.

6. A fuel injector isolator as in claim 5, wherein said support member inner periphery lead-in surface is frustoconical.

7. A fuel injector isolator as in claim 5, wherein:
   said isolation member extends along said axis from an isolation member first end surface to an isolation member second end surface such that said isolation member outer periphery upper retention surface is proximal to said isolation member first end surface and such that said isolation member outer periphery lower retention surface is distal from said isolation member first end surface;
   said isolation member outer periphery includes an isolation member outer periphery lead-in surface which is located axially between said isolation member outer periphery lower retention surface and said isolation member second end surface, said isolation member outer periphery lead-in surface decreasing in diameter along said axis in said first direction.

8. A fuel injector isolator as in claim 7, wherein said isolation member outer periphery lead-in surface is frustoconical.

9. A fuel injector isolator as in claim 7, wherein said isolation member outer periphery lead-in surface diverges away from said support member inner periphery in said first direction such that an annular space is formed between said isolation member outer periphery lead-in surface and said support member inner periphery.

10. A fuel injector isolator as in claim 5, wherein said isolation member outer periphery includes an isolation member outer periphery inclined surface which is shaped complementary to said support member inner periphery lead-in surface such that said isolation member outer periphery inclined surface mates with said support member inner periphery lead-in surface.

11. A fuel injector isolator as in claim 1, wherein:
said support member first end surface is perpendicular to said axis; and
said isolation member outer periphery upper retention surface is perpendicular to said axis.

12. A fuel injector for injecting fuel in a fuel consuming device, said fuel injector comprising:
a body configured to be inserted into a fuel injector receiving bore of said fuel consuming device along an axis, said body having a nozzle opening;
a valve needle within said body which moves between 1) an open position which allows fuel to flow out of said nozzle opening and 2) a closed position which prevents fuel from flowing from said nozzle opening; and
a fuel injector isolator comprising which isolates said body from said fuel consuming device, said fuel injector isolator comprising:
a support member which is rigid and which is annular in shape being centered about said axis such that said support member has a support member inner periphery which circumferentially surrounds said axis, said support member extending along said axis from a support member first end surface to a support member second end surface, wherein a profile of said support member inner periphery includes a concave region; and
an isolation member which is resilient and compliant and which is annular in shape being centered about said axis such that said support member has an isolation member outer periphery and an isolation member inner periphery within which said fuel injector is located, said isolation member being located within said support member inner periphery, said isolation member outer periphery having 1) an isolation member outer periphery upper retention surface which engages said support member first end surface, thereby fixing said isolation member relative to said support member in a first direction along said axis and 2) an isolation member outer periphery lower retention surface which extends into said concave region and engages said concave region of said support member, thereby fixing said isolation member relative to said support member in a second direction along said axis which is opposite to said first direction.

13. A fuel injector as in claim 12, wherein said support member inner periphery includes 1) a support member inner periphery central surface which is proximal to said support member first end surface and which is a first radial distance from said axis, 2) a support member inner periphery lower surface which is distal from said support member first end surface and which is a second radial distance from said axis such that said second radial distance is greater than said first radial distance, and 3) a support member inner periphery retention surface which is between said support member inner periphery central surface and said support member inner periphery lower surface, wherein said support member inner periphery retention surface and said support member inner periphery lower surface define said concave region.

14. A fuel injector as in claim 13, wherein:
said support member inner periphery retention surface is perpendicular to said axis; and
said isolation member outer periphery lower retention surface is perpendicular to said axis such that said isolation member outer periphery lower retention surface engages said support member inner periphery retention surface, thereby fixing said isolation member relative to said support member in said second direction.

15. A fuel injector as in claim 13, wherein;
said support member inner periphery retention surface is inclined relative to said axis; and
said isolation member outer periphery lower retention surface is inclined relative to said axis and complimentary to said support member inner periphery retention surface such that said isolation member outer periphery lower retention surface engages said support member inner periphery retention surface, thereby fixing said isolation member relative to said support member in said second direction.

16. A fuel injector as in claim 12, wherein said support member inner periphery includes a support member inner periphery lead-in surface which is located axially between said support member first end surface and said concave region, said support member inner periphery lead-in surface decreasing in diameter along said axis in said first direction.

17. A fuel injector as in claim 16, wherein:
said isolation member extends along said axis from an isolation member first end surface to an isolation member second end surface such that said isolation member outer periphery upper retention surface is proximal to said isolation member first end surface and such that said isolation member outer periphery lower retention surface is distal from said isolation member first end surface;
said isolation member outer periphery includes an isolation member outer periphery lead-in surface which is located axially between said isolation member outer periphery lower retention surface and said isolation member second end surface, said isolation member outer periphery lead-in surface decreasing in diameter along said axis in said first direction.

18. A fuel injector as in claim 17, wherein said isolation member outer periphery lead-in surface diverges away from said support member inner periphery in said first direction such that an annular space is formed between said isolation member outer periphery lead-in surface and said support member inner periphery.

19. A fuel injector as in claim 16, wherein said isolation member outer periphery includes an isolation member outer periphery inclined surface which is shaped complementary to said support member inner periphery lead-in surface such that said isolation member outer periphery inclined surface mates with said support member inner periphery lead-in surface.

20. A fuel injector as in claim 12, wherein:
said support member first end surface is perpendicular to said axis; and said isolation member outer periphery upper retention surface is perpendicular to said axis.

* * * * *